Patented Dec. 2, 1952

2,620,360

UNITED STATES PATENT OFFICE 2,620,360

MANUFACTURE OF GLYCOL ETHERS

Edgar C. Britton and Arthur R. Sexton, Midland, Mich., assignors to The Dow Chemical Company, Midland, Mich., a corporation of Delaware No Drawing. Application September 26, 1947, Serial No. 776,399

8 Claims. (Cl. 260—611)

This invention concerns an improved method for the reaction of alkylene oxides with alcohols to form corresponding glycol ethers. It pertains especially to certain substances which have been found to be highly effective as catalysts for such reactions. It pertains more particularly to a method wherein the new catalysts are employed to effect a reaction between an alkylene oxide and an alpha-aralkyl alcohol.

The expression "alpha-aralkyl alcohol" pertains to alpha-hydroxyalkyl aromatic compounds having the general formula:

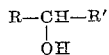

wherein R represents a monovalent aromatic radical having the valence on a carbon atom of the aromatic nucleus and R' represents an alkyl radical.

It is known to react an alkylene oxide with an alcohol in the presence of bleaching earths, or in the presence of small amounts of acids, such as sulfuric acid and phosphoric acid, or small amounts of strong alkalies such as sodium or potassium hydroxide. However, there are instances in which such known catalysts are ineffectual, or promote reactions other than for formation of the desired glycol ethers, or are otherwise unsatisfactory. For instance, sodium and potassium hydroxide exhibit little, if any, catalytic effect in the reaction between ethylene oxide or propylene oxide and an alpha-aralkyl alcohol, such as alpha-phenylethyl alcohol, at temperatures up to 150° C. Bleaching earths, or small amounts of strong acids such as sulfuric acid, when employed as catalysts in such reactions, promote decomposition, e. g. of the aralkyl alcohol, at temperatures as low as 100° C. or below.

It is an object of this invention to provide, as catalysts, certain substances which are generally effective in promoting reactions between alkylene oxides and alcohols to form glycol ethers and which are especially effective when employing alpha-aralkyl alcohols in such reaction. Another object is to provide a method of making glycol ethers which involves use of said catalytic substances. A particular object is to provide a method of making glycol ethers of alpha-aralkyl alcohols, especially of alpha-phenylethyl alcohol. Other objects will be apparent from the following description of the invention.

The invention comprises reacting an alkylene oxide and an alcohol in the presence of a mixture of water and an inorganic cyanide selected from the group consisting of the alkali metal cyanides and the alkaline earth metal cyanides as a catalyst for the reaction. The new catalyst materials consist of mixtures of water and an alkali metal cyanide or an alkaline earth metal cyanide, wherein the proportion of water to the inorganic cyanide compound may vary from 0.04 part to 100 parts by weight of water per part of inorganic cyanide. Such inorganic cyanides are obtainable by reacting an alkali metal hydroxide or an alkaline earth metal hydroxide with hydrocyanic acid.

The catalyst materials are preferably used in amounts of from 0.1 per cent to 5 per cent of the inorganic cyanide compound and from 0.2 per cent to 10 per cent of water, based on the amount of alcohol used. Somewhat larger proportions of the catalyst materials may be employed if desired.

Our new catalyst materials are useful in preparing glycol ethers by reacting an alkylene oxide with an aliphatic alcohol. They exhibit particularly valuable catalytic properties in the preparation of glycol ethers of alpha-aralkyl alcohols by reacting an alkylene oxide with an alpha-aralkyl alcohol such as alpha-phenylethyl alcohol.

We have found that alkylene oxides, having the general formula:

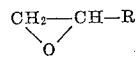

wherein R represents hydrogen or the methyl, ethyl, chloro-methyl or phenyl radical, react smoothly with aliphatic alcohols and with alpha-aralkyl alcohols to form the corresponding glycol ethers thereof in good yield, when mixtures of an alcohol and an alkylene oxide are heated to a temperature between about 100° C. and 220° C., preferably 130° C. to 160° C., in the presence of from 0.3 per cent to 15 per cent by weight of the catalyst materials, based on the alcohol. The reactants may be employed in any desired proportions. We generally use one molecular equivalent or more, e. g. from one to 10 mols, of the alcohol per mol of an alkylene oxide.

The reaction is usually complete in from 4 to 8 hours when carried out at superatmospheric pressure and at temperatures between 130° C. and 160° C. in the presence of, as a catalyst for the reaction, 0.5 per cent of sodium or potassium cyanide and about one per cent of water, based on the amount of alcohol used. The reaction mixture is filtered to remove any solid impurities and the products separated in any conventional manner, e. g. fractional distillation.

The following examples illustrate practice of the invention, but are not to be construed as limiting the scope thereof.

*Example 1*

600 grams (10 mols) of isopropyl alcohol, 6 grams of sodium cyanide, 12 grams of water and 220 grams (5 mols) of ethylene oxide were heated in an autoclave for six hours at a temperature of 155° C. to 160° C. The pressure gradually dropped from 160 to 120 pounds per square inch gauge. The reaction mixture was filtered and the filtrate was fractionally distilled to separate the products. There was obtained 70 grams (0.673 mol) of ethylene glycol mono-isopropyl ether as a water-white mobile liquid, 40 grams (0.270 mol) of diethylene glycol mono-isopropyl ether as a colorless liquid and 194 grams of liquid, higher boiling polyethylene glycol ethers.

*Example 2*

600 grams (10 mols) of isopropyl alcohol, 6 grams of sodium cyanide, 12 grams of water and 290 grams (5 mols) of propylene oxide were heated 5 hours in an autoclave at 155°–160° C. The pressure dropped from 180 to 120 pounds per square inch gauge during the reaction. The reacted mixture was filtered and the filtrate was fractionally distilled. There was obtained 151 grams (1.28 mols) of propylene glycol mono-isopropyl ether, a colorless mobile liquid, 33 grams (0.187 mol) of dipropylene glycol mono-isopropyl ether and 220 grams of liquid, higher boiling polypropylene glycol ethers.

*Example 3*

183 parts (1.50 mols) of alpha-phenylethyl alcohol, 1.48 parts of water and 0.93 part of sodium cyanide were heated in a closed reactor to a temperature of 150° C. 33 parts (0.75 mol) of ethylene oxide were added to the reactor over a period of 8 hours and under a pressure of 10 to 25 pounds per square inch, while maintaining the temperature at 145°–150° C. The reacted mixture was cooled, filtered, and the ethylene glycol ethers were separated by fractional distillation. There was obtained 38 parts (0.228 mol) of ethylene glycol mono-alpha-phenylethyl ether, a water-white liquid distilling at 122° C. at 10 mm. of mercury absolute pressure, 8.85 parts (0.042 mol) of diethylene glycol mono-alpha-phenylethyl ether boiling at 120° C. at one millimeter, and 18.65 parts of liquid, higher boiling polyethylene glycol mono - alpha - phenylethyl ethers.

*Example 4*

244 grams (2.0 mols) of alpha-phenylethyl alcohol, 58 grams (1.0 mol) of propylene oxide, 12 grams of barium cyanide and 24 grams of water were heated an iron autoclave to a temperature of from 150° C. to 160° C. The pressure dropped from 28 pounds per square inch gauge to zero pounds per square inch in one hour, but heating was continued for a total period of 4 hours. The reaction mixture was removed from the autoclave, filtered to remove insoluble impurities, and the filtrate fractionally distilled. There was obtained 85 grams (0.472 mol) of propylene glycol mono-alpha-phenylethyl ether, a water-white liquid, distilling at 90°–97° C. at 3 mm. of mercury absolute pressure and having a density $(d25/25)=1.0068$ and a refractive index $(n25/d)=1.4965$. The residue consisted of 21 grams of liquid higher boiling ethers.

*Example 5*

7320 grams (60 mols) of alpha-phenylethyl alcohol, 40 grams of sodium cyanide and 80 grams of water were heated to 135° C. in a closed vessel and 1600 grams (27.6 mols) of propylene oxide added thereto, under a pressure of 30–35 pounds, during a 4-hour period while maintaining the temperature at 135°–140° C. The reacted mixture was filtered and fractionally distilled. The product consisted of 78.6 per cent by weight of propylene glycol mono-alpha-phenylethyl ether, a colorless mobile liquid, distilling at 83°–93° C. at 1.5 millimeters, and 21.4 per cent of liquid, higher boiling ethers.

*Example 6*

183 grams (1.5 mols) of alpha-phenylethyl alcohol, 120 grams (1.0 mol) of styrene oxide, 5 grams of barium cyanide, and 10 grams of water were heated for 4 hours in an iron autoclave at a temperature of 150° C. The reaction product was removed from the autoclave, filtered to remove insoluble impurities, and the filtrate fractionally distilled. There was obtained 48 grams (0.215 mol) of phenylethylene glycol mono-alpha-phenylethyl ether, a pale yellow-colored liquid, distilling at 118°–125° C. at 3 millimeters of mercury pressure absolute. The ether product was purified by crystallization from a mixture of equal parts by volume of benzene and petroleum ether. It crystallized as a white flocculent precipitate. The purified ether product had a freezing point of 65.5°–67° C.

*Example 7*

800 grams of technical dodecyl alcohol, 2 grams of sodium cyanide and 2 grams of water were heated to 135° C. and 179 grams of ethylene oxide added thereto, under a pressure of 300 mm. of Hg during a period of 6 hours. The reaction mixture was cooled, filtered and distilled to remove excess alcohol. There was obtained 463 grams of a liquid product boiling above 109° C. at 0.4 mm. of Hg and consisting substantially of the mixed ethylene glycol ethers of dodecyl alcohol.

The technical dodecyl alcohol used in Example 7 was that obtainable on the open market. It consists of a major proportion of dodecyl alcohol (lauryl alcohol) together with minor proportions of tetradecyl alcohol and, it is believed, cetyl alcohol.

Other modes of applying the principle of our invention may be employed instead of those explained, change being made as regards the method or products herein disclosed, provided the steps or the compounds stated in any of the following claims or the equivalents of such stated steps or compounds be employed.

We claim:

1. In a process wherein an alkylene oxide having the formula:

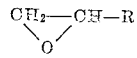

wherein R represents a member of the group consisting of hydrogen and the methyl, ethyl, chloromethyl, and phenyl, radicals, is reacted with an alpha-aralkyl alcohol to form a corresponding glycol ether, the step of heating the reactants at a reaction temperature between 100° and 220° C. in admixture with a catalyst containing as the essential catalytic ingredients, an inorganic cyanide selected from the group consisting of the alkali metal cyanides and the alkaline earth metal cyanides, in amount corresponding to from 0.1 to 5 per cent by weight of the alcohol, and water in amount of from 0.2 to 10 per cent by weight of the alcohol.

2. In a method wherein an alkylene oxide having the formula:

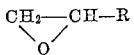

wherein R represents a member of the group consisting of hydrogen and the methyl, ethyl, chloromethyl, and phenyl, radicals is reacted with alpha-phenylethyl alcohol to form a corresponding glycol ether, the step of heating a mixture of the reactants at a reaction temperature between 100° and 220° C. in admixture with a catalyst containing as the essential catalytic ingredients, an inorganic cyanide selected from the group consisting of the alkali metal cyanides and the alkaline earth metal cyanides, in amount corresponding to from 0.1 to 5 per cent by weight of the alcohol, and water in amount of from 0.2 to 10 per cent by weight of the alcohol.

3. A process as described in claim 2 wherein, the catalyst is a mixture of an alkali metal cyanide in amount corresponding to from 0.1 to 5 per cent by weight of the alcohol and water in amount of from 0.2 to 10 per cent by weight of the alcohol.

4. A process as described in claim 2 wherein, the catalyst is a mixture of an alkaline earth metal cyanide in amount corresponding to from 0.1 to 5 per cent by weight of the alcohol and water in amount of from 0.2 to 10 per cent by weight of the alcohol.

5. A process as described in claim 2 wherein, the alkylene oxide is ethylene oxide and the catalyst is a mixture of sodium cyanide in amount corresponding to from 0.1 to 5 per cent by weight of the alcohol and water in amount of from 0.2 to 10 per cent by weight of the alcohol.

6. A process as described in claim 2 wherein, the alkylene oxide is propylene oxide and the catalyst is a mixture of sodium cyanide in amount corresponding to from 0.1 to 5 per cent by weight of the alcohol and water in amount of from 0.2 to 10 per cent by weight of the alcohol.

7. A process as described in claim 2 wherein, the alkylene oxide is styrene oxide and the catalyst is a mixture of barium cyanide in amount corresponding to from 0.1 to 5 per cent by weight of the alcohol and water in amount of from 0.2 to 10 per cent by weight of the alcohol.

8. A process as described in claim 2 wherein, the alkylene oxide is propylene oxide and the catalyst is a mixture of barium cyanide in amount corresponding to from 0.1 to 5 per cent by weight of the alcohol and water in amount of from 0.2 to 10 per cent by weight of the alcohol.

EDGAR C. BRITTON.
ARTHUR R. SEXTON.

REFERENCES CITED

The following references are of record in the file of this patent:

UNITED STATES PATENTS

| Number | Name | Date |
|---|---|---|
| 1,931,853 | Baur | Oct. 24, 1933 |
| 2,053,708 | Fife | Sept. 8, 1936 |
| 2,066,076 | Reppe et al. | Dec. 29, 1936 |
| 2,174,761 | Schuette et al. | Oct. 3, 1939 |
| 2,325,589 | Bried | Aug. 3, 1943 |
| 2,327,053 | Marple et al. | Aug. 17, 1943 |
| 2,355,823 | Schlegel | Aug. 15, 1944 |
| 2,372,615 | Thomas et al. | Mar. 27, 1945 |
| 2,380,185 | Marple et al. | July 10, 1945 |